US012090782B2

(12) United States Patent
Augustsson et al.

(10) Patent No.: US 12,090,782 B2
(45) Date of Patent: Sep. 17, 2024

(54) WHEEL END ASSEMBLY FOR A VEHICLE

(71) Applicant: Volvo Truck Corporation, Gothenburg (SE)

(72) Inventors: Kent Augustsson, Bollebygd (SE); Marcel Palmgren, Torslanda (SE); Ramachandran Sandrasekaran, Karnataka (IN); Tobias Andersson, Torslanda (SE); Luciano Scoparo, Gothenburg (SE); Deepak Sheelvant, Karnataka (IN)

(73) Assignee: Volvo Truck Corporation, Gothenburg (SE)

( * ) Notice: Subject to any disclaimer, the term of this patent is extended or adjusted under 35 U.S.C. 154(b) by 323 days.

(21) Appl. No.: 17/482,698

(22) Filed: Sep. 23, 2021

(65) Prior Publication Data
US 2022/0111680 A1   Apr. 14, 2022

(30) Foreign Application Priority Data
Oct. 9, 2020   (IN) .............................. 202041044142

(51) Int. Cl.
*B60B 27/00* (2006.01)
*B60B 27/02* (2006.01)

(52) U.S. Cl.
CPC ........ *B60B 27/0073* (2013.01); *B60B 27/001* (2013.01); *B60B 27/02* (2013.01); *B60B 2360/102* (2013.01); *B60B 2360/104* (2013.01)

(58) Field of Classification Search
CPC ..... B60B 7/001; B60B 7/0028; B60B 7/0073; B60B 7/02; B60B 2360/102;
(Continued)

(56) References Cited

U.S. PATENT DOCUMENTS 2,474,283 A * 6/1949 Simpkins ................ B60B 27/02
                                                              301/128
7,147,379 B2* 12/2006 Ohtsuki ................. F16J 15/326
                                                              384/482
(Continued)

FOREIGN PATENT DOCUMENTS

DE   102006023547 A1    11/2007
DE   102019115939 A1 * 12/2020   .......... F16C 33/7886
(Continued)

OTHER PUBLICATIONS

Extended European Search Report for European Patent Application No. 21199825.7, mailed Feb. 4, 2022, 7 pages.

*Primary Examiner* — S. Joseph Morano
*Assistant Examiner* — Eva L Comino
(74) *Attorney, Agent, or Firm* — Withrow & Terranova, PLLC

(57) ABSTRACT

The invention relates to a wheel end assembly for a vehicle, comprising a wheel end bearing, a hub casing including a first material and a different second material joined together as a single piece, the hub casing comprising a radially external body of said first material and a radially internal tubular core of said second material, the tubular core being provided concentrically around the wheel end bearing, and an annular seal which is concentric with the wheel end bearing and the hub casing, wherein the annular seal has a radial extension from the wheel end bearing towards and into contact with one of the external body and the tubular core, and wherein the annular seal is spaced apart from the other one of the external body and the tubular core. The invention also relates to a wheel end arrangement and to a vehicle.

15 Claims, 3 Drawing Sheets

(58) Field of Classification Search
CPC ............ B60B 2360/104; B60B 27/001; B60B 27/0078; B60B 27/0073; B60B 27/02
USPC ........................................................ 301/109
See application file for complete search history.

(56) References Cited

U.S. PATENT DOCUMENTS

| | | | |
|---|---|---|---|
| 11,772,419 B2 * | 10/2023 | Kamath | B60B 27/02 301/105.1 |
| 2012/0074766 A1 | 3/2012 | Alcantara Burguete et al. | |
| 2012/0248858 A1 * | 10/2012 | Re | B22D 19/04 301/109 |
| 2013/0342004 A1 * | 12/2013 | Yamauchi | B60B 27/0026 301/109 |
| 2014/0233876 A1 * | 8/2014 | Ishikawa | F16C 33/60 384/477 |
| 2016/0031259 A1 * | 2/2016 | Champion | B60B 27/001 29/894.362 |
| 2016/0031260 A1 * | 2/2016 | Starck | B60B 27/0005 301/109 |

FOREIGN PATENT DOCUMENTS

| | | | | | |
|---|---|---|---|---|---|
| JP | | 2013032095 A | * | 2/2013 | ......... B60B 27/0005 |
| KR | | 102592737 B1 | * | 12/2018 | ........ B60B 27/0005 |
| WO | | 9507417 A1 | | 3/1995 | |
| WO | WO 2013018394 A1 | | * | 2/2013 | ............. B60B 35/14 |

\* cited by examiner

WHEEL END ASSEMBLY FOR A VEHICLE

RELATED APPLICATION

The present application claims priority to Indian Patent Application No. 202041044142, filed on Oct. 9, 2020, and entitled "WHEEL END ASSEMBLY FOR A VEHICLE," which is incorporated herein by reference in its entirety.

TECHNICAL FIELD

The invention relates to a wheel end assembly for a vehicle. The invention also relates to a wheel end arrangement comprising such a wheel end assembly, and to a vehicle comprising such a wheel end assembly.

The invention can be applied in heavy-duty vehicles, such as trucks, buses and construction equipment. Although the invention will be described with respect to a truck, the invention is not restricted to this particular vehicle, but may also be used in other vehicles such as passenger cars.

BACKGROUND

The wheels of a vehicle, such as a truck, are normally connected to a respective wheel end hub or hub casing. In its turn, the wheel end hub may be connected to a rotatable wheel axle, whereby rotation of the wheel axle is conveyed into rotation of the wheels. The wheel end hub is commonly coaxially mounted to a wheel end bearing which in turn is coaxially mounted around the wheel axle, typically around a spindle enclosing the wheel axle. For a non-driven wheel the wheel end hub is commonly coaxially mounted to a wheel end bearing which in turn is coaxially mounted to a solid steering knuckle. Irrespective of the wheel end bearing being mounted to a spindle or a steering knuckle, it has an inner ring and an outer ring between which bearing elements are provided for enabling relative rotation between the inner ring and the outer ring. The wheel end hub is fixedly connected to one of said rings, typically the outer ring, with which it rotates.

In the vehicle industry there is a continuous strive towards reducing the weight of the vehicle component in order to reduce fuel consumption and exhaust emissions. To this end, it is known to provide a wheel end hub having a body of an outer lightweight material which surrounds an inner core made of a hard and tough material.

SUMMARY

An object of the invention is to provide a wheel end assembly which alleviates the drawbacks of the prior art.

The object is achieved by a wheel end assembly according to claim 1.

The invention is based on the insight that by designing a wheel end hub or hub casing made up by two material parts which have been joined together, those two material parts may suitably have different axial extensions, thereby making it possible to seal off the interface between the two material part by only applying a sealing contact to one of the material parts.

Thus, according to a first aspect of the invention, there is provided a wheel end assembly for a vehicle, the wheel end assembly being configured to be supported by a central wheel support member such as a spindle or a steering knuckle, the wheel end assembly comprising:

a wheel end bearing configured to be arranged concentrically around the central wheel support member, a hub casing including a first material and a different second material joined together as a single piece, the hub casing comprising a radially external body of said first material and a radially internal tubular core of said second material, the tubular core being provided concentrically around the wheel end bearing, and an annular seal which is concentric with the wheel end bearing and the hub casing, wherein the annular seal has a radial extension from the wheel end bearing towards and into contact with one of the external body and the tubular core, and wherein the annular seal is spaced apart from the other one of the external body and the tubular core.

By the provision of a sealing contact with only one of the first and second materials, a more controllable sealing effect is achieved than if a seal is to be able to properly seal against two different materials. In other words, an advantage of the inventive solution compared to the prior art is that it is easier to implement a water-tight seal against a single material, e.g. selecting a material for the bearing seals. This will create a more stable and efficient enclosure for the interface between the body of the first material and the tubular core of the second material.

Thus, depending on how the axial extension of the tubular core is designed relative to the axial extension of the body, the seal may be placed in contact with either one of the two materials. From a manufacturing and design perspective it may be suitable to have a larger axial extension for the body compared to the surrounded tubular core. In such case, the, annular seal may suitably have a radial extension from the wheel end bearing towards and into contact with the external body, and wherein the annular seal is spaced apart from the tubular core. Thus, this will seal off the available space at the tubular core. In other configurations, however, it is conceivable to provide the annular seal in contact with the tubular core, and instead be spaced apart from the body. Nevertheless, in the following disclosure, the main focus will be on the first example (i.e. axially shorter core and axially longer body) when different features of exemplary embodiments are discussed.

It should be understood that in this disclosure, the two materials may have been joined together as a single piece by any suitable joining method. For instance, the joining method could chemical (such as casted to a single piece) or physical (mechanically locked together, such as by means of screws or shrink joints etc.). Thus, a single piece should in this disclosure be understood as, in terms of practical handling, the hub casing is handled as a single piece, although it may consist of several parts which have been locked together. It should thus be understood that the herein discussed challenges with regard to interface between the two materials are relevant irrespective of which joining method that has been used for providing the hub casing.

It should be noted that in this disclosure, when directional or geometrical terms such as "axial", "radial", "circumferential", or derivatives thereof, are used, it is from the perspective of a cylindrical (r, θ, z) coordinate system, as follows. An axial direction z is along (or in parallel with) the common central geometrical axis of the wheel end bearing, the annular seal, and the hub casing. A radial direction r extends perpendicular from the central geometrical axis towards the wheel end bearing (and the other surrounding components) or vice versa. A circumferential direction θ is a circular direction around the central geometrical axis, i.e. the rotational direction of a wheel mounted to the wheel end hub.

According to at least one exemplary embodiment, said body has a radially inwards facing first perimeter, wherein said tubular core has a radially inwards facing second perimeter, wherein an interface between said first and second perimeter faces an annular space which is sealed off by said annular seal. Thus, the part of the interface which is "visible", i.e. visible when just looking at the hub casing before it is mounted to its position around the wheel end bearing, will be facing radially inwardly. Put differently, if regarded from the centre axis of the hub casing, a cylindrical surface of the first material is seen axially next to, and interfacing, a cylindrical surface of the second material. Suitably, as will be discussed in more detail further below, the body may be axially enclosing the tubular core at both axial ends of the tubular core. In such case, if regarded from the centre axis of the hub casing, a cylindrical surface of the second material is seen axially between cylindrical surfaces of the first material, and consequently two interfaces being present, one at each axial end of the tubular core.

Thus, in the case of a radially inwardly facing interface, as described above, the annular seal should be axially displaced from such an interface. This is reflected in at least one exemplary embodiment, according to which the annular seal is out of contact from said interface.

According to at least one exemplary embodiment, the wheel end bearing comprises roller elements accommodated between an inner race-forming part and an outer race-forming part surrounding the inner race-forming part, wherein the inner race-forming part is configured to be supported by the central wheel support member. The inner race-forming part may be an inner ring of the wheel end bearing or may include an inner ring of said bearing. Similarly, the outer race-forming part may be an outer ring of the wheel end bearing or may include an outer ring of said bearing.

According to at least one exemplary embodiment, the annular seal is in contact with the inner race-forming part. The inner race-forming part may suitably extend axially beyond the outer race-forming part. The annular seal may thus extend radially from the inner race forming part, past the roller elements (and suitably past at least a part of the outer race-forming parts) and into contact with the relevant material of the hub casing. Suitably, the body, i.e. the first material, extends axially beyond the tubular core, i.e. the second material, in which the case annular seal may extend radially from the inner-race forming part to the body of the hub casing. Hereby, the annular seal will seal off an annular space defined by the seal and the wheel end bearing and the tubular core, and suitably also by the interface and a small portion of the body. The part of the body/core-interface that faces the annular space is protected from ingress of moisture by the axially displaced annular seal.

From the above it can be understood, that suitably, according to at least one exemplary embodiment, the annular seal may be out of contact from the outer race-forming part. This is particularly advantageous if the annular seal extends from the inner race-forming part, since the outer race-forming part should be able to rotate smoothly around the inner race-forming part.

According to at least one exemplary embodiment, the tubular core extends axially beyond both axial ends of the outer race forming part. According to at least one exemplary embodiment, the body of the hub casing extends axially beyond both axial ends of the tubular core.

According to at least one exemplary embodiment, the first material is a lightweight material, such as a lightweight metal or alloy. According to at least one exemplary embodiment, the first material is aluminium.

According to at least one exemplary embodiment, the second material is a relatively heavier, harder and/or tougher material. According to at least one exemplary embodiment, the second material is iron, cast iron or steel.

Thus, in at least some exemplary embodiment, the body may be of aluminium and the surrounded tubular core may be of cast iron, which has been joined to the aluminium body to form an integral hub casing.

According to at least one exemplary embodiment, said wheel end bearing is a first wheel end bearing, wherein the wheel end assembly further comprises a second wheel end bearing, one of the first and second wheel end bearings being an inboard wheel end bearing and the other one being an outboard wheel end bearing, the outboard wheel end bearing being intended to be located farther away from a central longitudinal axis of the vehicle than the inboard wheel end bearing. It should thus be understood that features discussed in this disclosure in relation to a general wheel end bearing, may apply to either one of, or both of, the inboard and outboard wheel end bearings. For instance, a respective seal may extend from a respective inner race-forming part of both the inboard and outboard wheel end bearings. Thus, the previous discussions and features in relation to a general wheel end bearing may be duplicated/mirrored and be applied to both an inner and an outer wheel end bearing.

According to at least one exemplary embodiment, said annular seal is a first annular seal, wherein the wheel end assembly further comprises a second annular seal, the first annular seal having a radial extension from the external body towards and into contact with one of the inboard and outboard wheel end bearings, the second annular seal having a radial extension from the external body towards and into contact with the other one of the inboard and outboard wheel end bearings, and wherein each one of the first and second annular seals is spaced apart from the tubular core. Thus, the first and second annular seals may axially enclose the roller bearings (and suitably the outer race-forming part) located between the first and second annular seals.

According to at least one exemplary embodiment, as seen in the axial direction of the tubular core, the tubular core is located between the first and the second annular seals. In other words, if the first annular seal lies in a first geometrical plane which is perpendicular to the central geometrical axis of the wheel end assembly, and the second annular seal lies in a second geometrical plane which is perpendicular to the central geometrical axis, then the tubular core is located between (without coinciding with) those two geometrical planes. Suitably, the interface to the surrounding body of the hub casing is also located between those two geometrical planes.

According to at least one exemplary embodiment, the tubular core is provided concentrically around the inboard and outboard wheel end bearings. This provides for a stable support of the wheel end assembly.

According to at least one exemplary embodiment, the annular seal discussed above, or the first and the second annular seal discussed above, may suitably comprise metal and/or rubber. For instance, such an annular seal may, in at least some exemplary embodiments, comprise a supporting part which may suitably be of sheet metal, and one or more sealing parts carried by the supporting part. The sealing parts may, for instance, be made of rubber. However, other material choices than those exemplified above, are also conceivable.

According to a second aspect of the invention, there is provided a wheel end arrangement comprising a wheel end assembly according to the first aspect, including any embodiment thereof, and also comprising a central wheel support member such as a spindle or a steering knuckle, the wheel end assembly being supported by the central wheel support member. The advantages of the wheel end arrangement of the second aspect substantially correspond to the advantages of the wheel end assembly of the first aspect and its embodiments.

According to a third aspect of the invention, there is provided a vehicle comprising a wheel end assembly according to the first aspect, including any embodiment thereof, or a wheel end arrangement according to the second aspect. The advantages of the vehicle of the third aspect substantially correspond to the advantages of the wheel end assembly of the first aspect and its embodiments and/or the wheel end arrangement of the second aspect.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
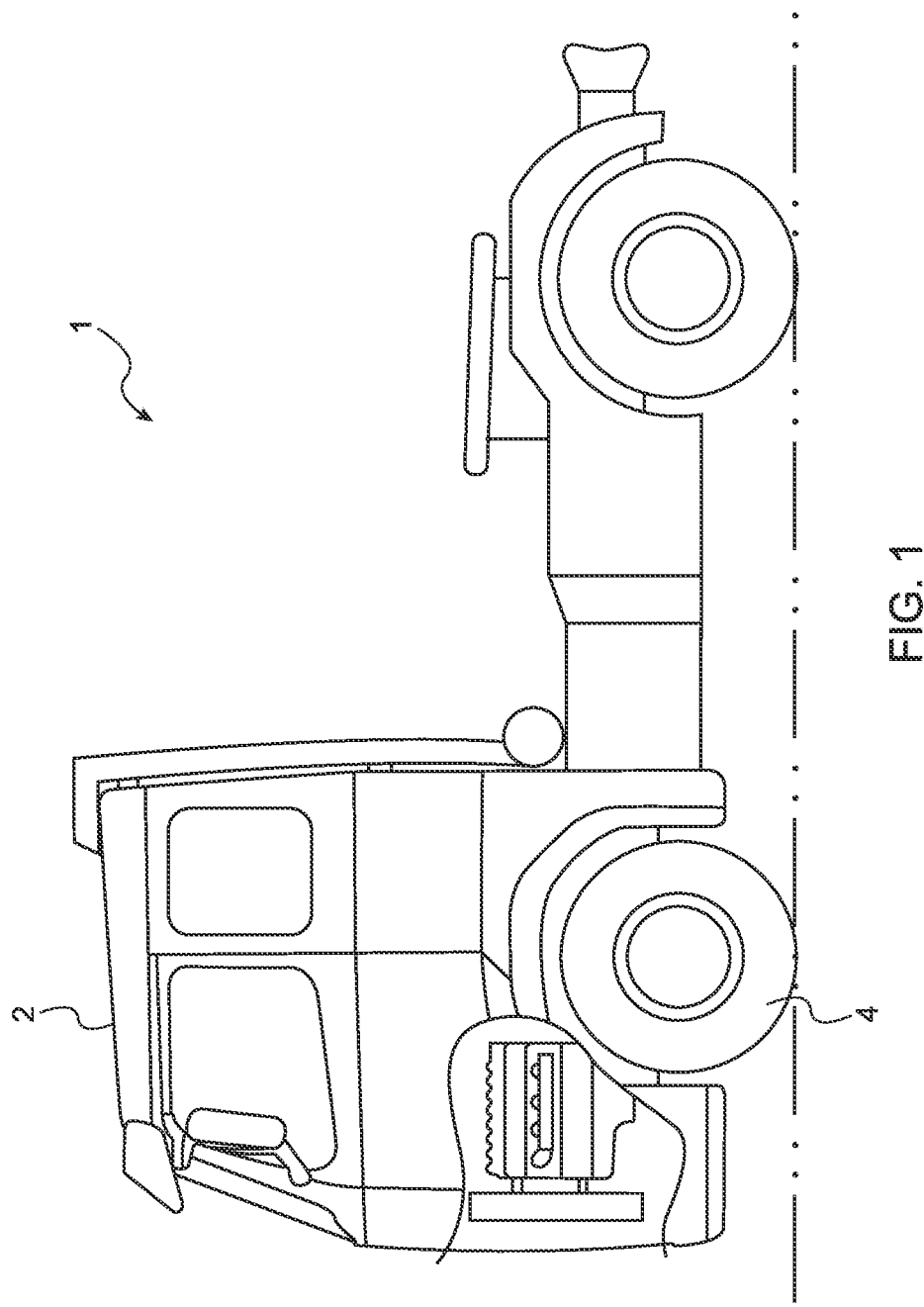
FIG. 1 illustrates a vehicle, in accordance with at least one exemplary embodiment of the invention.

FIG. 1 illustrates a vehicle 1, in accordance with at least one exemplary embodiment of the invention. Although the vehicle 1 is illustrated in the form of a truck, other types of vehicles, such as busses, construction equipment, trailers or passenger cars may be provided in accordance with the invention.

The truck (vehicle 1) comprises a cab 2 in which a driver may operate the vehicle 1. The vehicle comprises a number of road wheels 4, herein illustrated as two pairs of wheels, however, in other embodiments there may be a different number of wheels, such as three pairs, four pairs or more. The rotation of the wheels 4 is facilitated by means of wheel end bearings (not shown in FIG. 1). Although FIG. 1 may illustrate a human-operated vehicle 1, in other exemplary embodiments, the vehicle 1 in FIG. 1 may represent an autonomous vehicle. The vehicle 1 may comprise any embodiment of a wheel end assembly disclosed herein. For instance, the vehicle 1 may comprise a wheel and arrangement and a wheel end assembly as exemplified in FIG. 2.

Figure 2:
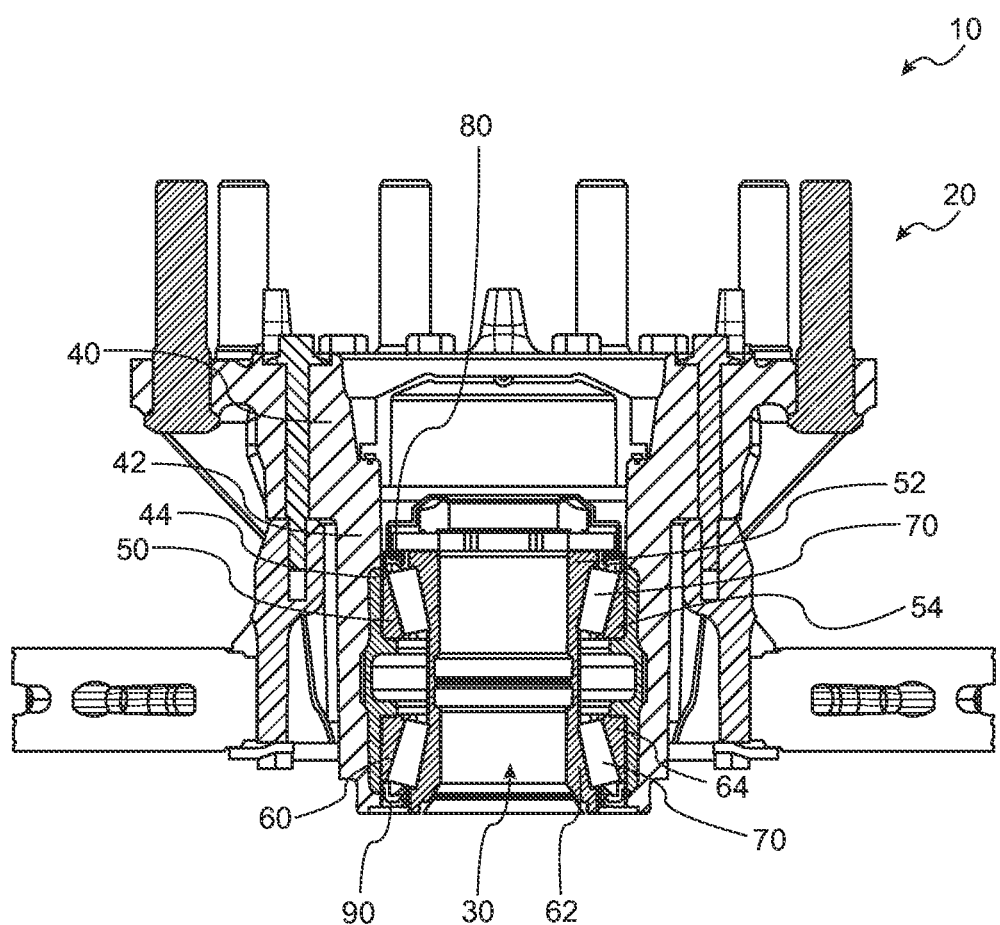
FIG. 2 is illustrates a wheel end arrangement comprising a wheel end assembly, in accordance with at least one exemplary embodiment of the invention.

FIG. 2 is illustrates a wheel end arrangement 10 comprising a wheel end assembly 20, in accordance with at least one exemplary embodiment of the invention. The wheel end arrangement 10 also comprises a central wheel support member 30.

The wheel end assembly 20 comprises wheel end hub or a hub casing 40, which is configured to receive and hold a road wheel (not illustrated in FIG. 2). The hub casing 20 is rotationally mounted to the central wheel support member 30 via wheel end bearings 50, 60.

In FIG. 2 the central wheel support member 30 has been illustrated in the form of a hollow spindle, which may typically be provided at the rear wheels of a vehicle and is used in connection with driven wheels. Normally, a drive shaft or axle extends through the spindle and is fixed to the outside of the wheel end hub for propulsion of the wheel. However, it should be understood that the inventive principle could also be used in relation to a steering knuckle, which may typically be provided at the front wheels of a vehicle. The knuckle is solid and used for non-driven wheels.

The wheel end bearings comprises an outboard wheel end bearing 50 and an inboard wheel end bearing 60, each of which is concentrically arranged around the central wheel support member 30. Of the two, it is the inboard wheel end bearing 60 which is configured to be located closest to a central longitudinal axis of the vehicle. Conversely, of the two, it is the outboard wheel end bearing 50 which is configured to be located furthest away from the central longitudinal axis of the vehicle.

The outboard wheel end bearing 50 comprises an inner-race forming part 52 and an outer race-forming part 54. The outboard wheel end bearing 50 also comprises roller elements 70 accommodated between the inner race-forming part 52 and the outer race-forming part 54. The roller elements 70 may suitably be circumferentially separated from each other by a cage having individual holes for each roller element 70. The relative motions of the inner and outer race-forming parts 52, 54 causes the roller elements 70 to roll with very little rolling resistance. The inner race-forming part 52 may also be referred to as an inner ring and the outer race-forming part 54 may also be referred to as an outer ring. In a similar way, the inboard wheel end bearing 60 comprises roller elements 70 accommodated between an inner race-forming part 62 and an outer race-forming part 64. The inner race-forming part 52 of the outboard wheel end bearing 50 (and similarly the inner race-forming part 62 of the inboard wheel end bearing 60) is mounted to the central wheel support member 30.

Thus, the wheel end assembly 20 comprises at least one wheel end bearing. In the present illustration, the wheel end assembly comprises the outboard wheel end bearing 50 and the inboard wheel end bearing 60, both of which are concentrically arranged around the central wheel support member 30.

The wheel end assembly 20 further comprises the hub casing 40. The hub casing 40 includes a first material and a different second material joined together as a single piece. More specifically, the hub casing 40 comprises a radially external body 42 of the first material and a radially internal tubular core 44 of the second material. The first material may suitably be a lightweight material, such as aluminium. The second material may suitably be a stronger and heavier material, such as iron, cast iron or steel. For instance, the tubular core 44 may be made of cast iron and joined to an external body 42 of aluminium. The tubular core 44 is provided concentrically around the outboard wheel end bearing 50 and the inboard wheel end bearing 60. The external body 42 is provided concentrically around the tubular core 44.

The wheel end assembly 20 also comprises at least one annular seal, here illustrated as a two annular seals, namely a first annular seal 80 and a second annular seal 90. The annular seals 80, 90 are concentric with the wheel end bearings 50, 60 and the hub casing 40, i.e. they share a common geometrical central axis. The annular seals 80, 90 are seen more clearly in the enlarged view shown in FIG. 3, which is a detailed view of a portion of the wheel end assembly 20 in FIG. 2.

Figure 3:
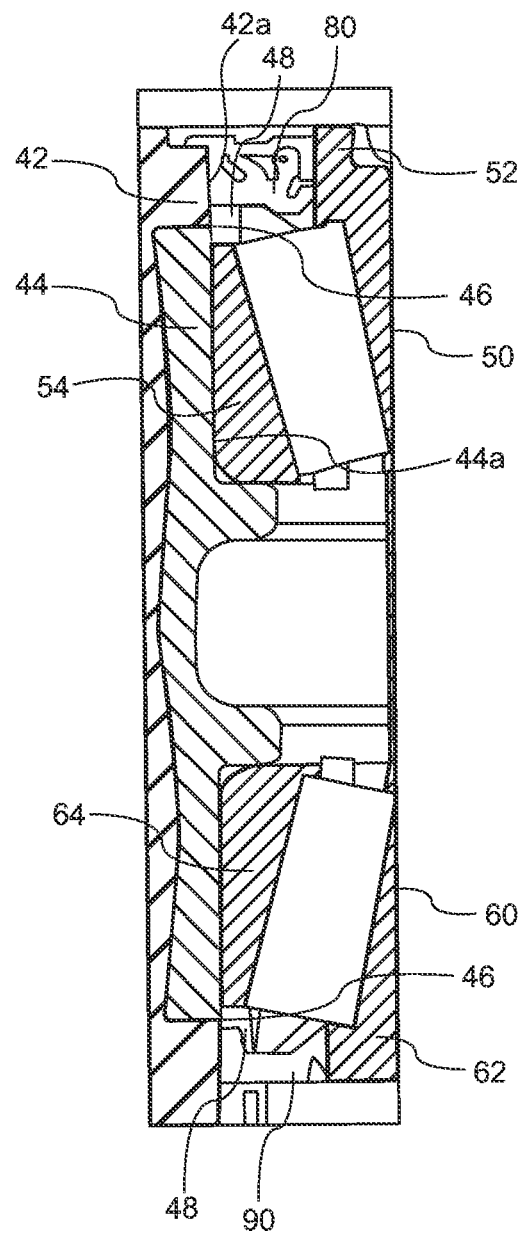
FIG. 3 is a detailed view of a portion of the wheel end assembly in FIG. 2.

As can be seen in FIG. 3, each one of the first annular seal 80 and the second annular seal 90 has a radial extension from the respective wheel end bearing 50, 60 and into contact with the external body 42, and the first and second annular seals 80, 90 are spaced apart from the tubular core 44. However, in other exemplary embodiments, such as in exemplary embodiments in which the external body and the tubular core has other axial extensions, it may be conceivable to have the first and second annular seals be in contact with the tubular core, and thus spaced apart from the external body. Thus, in general terms, this disclosure teaches that an annular seal may have a radial extension from the wheel end bearing towards and into contact with one of the external body and the tubular core, wherein the annular seal is spaced apart from the other one of the external body and the tubular core.

As can be seen in FIG. 3, at the outboard wheel end bearing 50, the external body 42 may have a radially inwards facing first perimeter 42a and the tubular core 44 may have a radially inwards facing second perimeter 44a. An interface 46 between the first perimeter 42a and the second perimeter 44a may face an annular space 48 which is sealed off by the first annular seal 80. A corresponding body/core-interface 46 and space 48 is similarly present at the inboard wheel end bearing 60 and sealed off by the second annular seal 90. Thus, each one of the first annular seal 80 and the second annular seal 90 is out of contact from the body/core-interface 46 at the respective wheel end bearing 50, 60.

Each annular seal 80, 90 may be in contact with an inner race-forming part 52, 62 of a wheel end bearing 50, 60. As illustrated in FIG. 3, the first annular seal 80 is in contact with the inner race-forming part 52 of the outboard wheel end bearing 50, while the second annular seal 90 is in contact with the inner race-forming part 62 of the inboard wheel end bearing 60.

Similarly, each annular seal 80, 90 may suitably be out of contact with an outer race forming part 54, 64 of a wheel end bearing 50 60. As illustrated in FIG. 3, the first annular seal 80 is out of contact from the outer race-forming part 54 of the outboard wheel end bearing 50, while the second annular seal 90 is out of contact from the outer race-forming part 64 of the inboard wheel end bearing 60.

In the illustrated exemplary embodiment, as seen in the axial direction of the tubular core 44, the tubular core 44 is located between the first annular seal 80 and the second annular seal 90. Thus, the tubular core 44 is axially spaced from each one of the first annular 80 seal and the second annular seal 90.

Since the first annular seal 80 and the second annular seal 90 is only in contact with one of the materials of the hub casing 40 (in the illustrated embodiment, only in contact with the external body 42, which is suitably of aluminium), the drawback of the prior art may be mitigated. A water-tight seal against a single material of the hub casing 40 is easier to implement, than sealing against both materials of the hub casing 40. A more stable and efficient enclosure for the body/core-interface 46 may be achieved in this way.

It is to be understood that the present invention is not limited to the embodiments described above and illustrated in the drawings; rather, the skilled person will recognize that many changes and modifications may be made within the scope of the appended claims.

For instance, although the drawings show an outboard wheel end bearing 50 and an inboard wheel end bearing 60, and thereto associated first annular seal 80 and second annular seal 90, it should be understood that the general inventive concept is not limited to such duality. The general inventive concept of sealing off a space 48 by means of an annular seal by only contacting one of the materials of a bi-material hub casing 40 is applicable also to a wheel end assembly having only one wheel end bearing and only one annular seal. Furthermore, the general inventive concept may be combined with other sealing arrangements. For instance, if the wheel end assembly comprises two wheel end bearings, then one of the wheel end bearings may be provided with an annular seal as disclosure herein (suitably the wheel end bearing being most exposed to the risk of contamination) and thus only contacting one of the materials of the hub casing as taught herein, while the other one of the wheel end bearings may be provide with some other sealing arrangement than the one disclosed herein (such other sealing arrangement might or might not contact both materials).

The invention claimed is:

1. A wheel end assembly for a vehicle, the wheel end assembly supported by a central wheel support member, the wheel end assembly comprising:
   a wheel end bearing arranged concentrically around the central wheel support member,
   a hub casing including a first material and a different second material joined together as a single piece, the hub casing comprising a radially external body of the first material and a radially internal tubular core of the second material, the tubular core being provided concentrically around the wheel end bearing, and
   an annular seal which is concentric with the wheel end bearing and the hub casing, wherein the annular seal has a radial extension from the wheel end bearing towards and into contact with one of the external body and the tubular core, and wherein the annular seal is spaced apart from the other one of the external body and the tubular core,
   wherein the wheel end assembly is configured to hold a wheel and rotate around the central wheel support; and
   wherein the radially external body is provided concentrically around the radially internal tubular core.

2. The wheel end assembly of claim 1, wherein the annular seal has a radial extension from the wheel end bearing towards and into contact with the external body, and wherein the annular seal is spaced apart from the tubular core.

3. The wheel end assembly of claim 1, wherein the external body has a radially inwardly facing first perimeter, wherein the tubular core has a radially inwardly facing second perimeter, wherein an interface between the first and second perimeter faces an annular space which is sealed off by the annular seal.

4. The wheel end assembly of claim 3, wherein the annular seal is out of contact from the interface.

5. The wheel end assembly of claim 1, wherein the wheel end bearing comprises roller elements between an inner race-forming part and an outer race-forming part surrounding the inner race-forming part, wherein the inner race-forming part is configured to be supported by the central wheel support member.

6. The wheel end assembly of claim 5, wherein the annular seal is in contact with the inner race-forming part.

7. The wheel end assembly of claim 5, wherein the annular seal is out of contact from the outer race-forming part.

8. The wheel end assembly of claim 1, wherein the first material is aluminium.

9. The wheel end assembly of claim 1, wherein the second material is iron, cast iron, or steel.

10. The wheel end assembly of claim 1, wherein the wheel end bearing is a first wheel end bearing, wherein the wheel end assembly further comprises a second wheel end bearing, one of the first and second wheel end bearings being an inboard wheel end bearing and the other one being an outboard wheel end bearing, the outboard wheel end bearing being intended to be located farther away from a central longitudinal axis of the vehicle than the inboard wheel end bearing.

11. The wheel end assembly of claim 10, wherein the annular seal is a first annular seal, wherein the wheel end assembly further comprises a second annular seal, the first annular seal having a radial extension from the external body towards and into contact with one of the inboard and outboard wheel end bearings, the second annular seal having a radial extension from the external body towards and into contact with the other one of the inboard and outboard wheel end bearings, and wherein each one of the first and second annular seals is spaced apart from the tubular core.

12. The wheel end assembly of claim 11, wherein, as seen in the axial direction of the tubular core, the tubular core is located between the first and the second annular seals.

13. The wheel end assembly of claim 10, wherein the tubular core is provided concentrically around the inboard and outboard wheel end bearings.

14. A wheel end arrangement comprising:
a central wheel support member;
a wheel end assembly for a vehicle, the wheel end assembly supported by the central wheel support member, the wheel end assembly comprising:
  a wheel end bearing arranged concentrically around the central wheel support member,
  a hub casing including a first material and a different second material joined together as a single piece, the hub casing comprising a radially external body of the first material and a radially internal tubular core of the second material, the tubular core being provided concentrically around the wheel end bearing, and
  an annular seal which is concentric with the wheel end bearing and the hub casing, wherein the annular seal has a radial extension from the wheel end bearing towards and into contact with one of the external body and the tubular core, and wherein the annular seal is spaced apart from the other one of the external body and the tubular core,
wherein the wheel end assembly is configured to hold a wheel and rotate around the central wheel support; and
wherein the radially external body is provided concentrically around the radially internal tubular core.

15. A vehicle comprising:
a wheel end assembly for a vehicle, the wheel end assembly supported by a central wheel support member, the wheel end assembly comprising:
a wheel end bearing arranged concentrically around the central wheel support member,
a hub casing including a first material and a different second material joined together as a single piece, the hub casing comprising a radially external body of the first material and a radially internal tubular core of the second material, the tubular core being provided concentrically around the wheel end bearing, and
an annular seal which is concentric with the wheel end bearing and the hub casing, wherein the annular seal has a radial extension from the wheel end bearing towards and into contact with one of the external body and the tubular core, and wherein the annular seal is spaced apart from the other one of the external body and the tubular core,
wherein the wheel end assembly is configured to hold a wheel and rotate around the central wheel support; and
wherein the radially external body is provided concentrically around the radially internal tubular core.

* * * * *